United States Patent [19]

Kolker

[11] 3,770,133
[45] Nov. 6, 1973

[54] BICYCLE STORAGE DEVICE
[75] Inventor: William A. Kolker, Downers Grove, Ill.
[73] Assignee: Edward P. Miller, Downers Grove, Ill. ; a part interest
[22] Filed: Feb. 11, 1972
[21] Appl. No.: 225,424

[52] U.S. Cl. .................................. 211/19, 105/367
[51] Int. Cl. .............................................. B62h 3/12
[58] Field of Search .................. 211/17, 18, 19, 20; 214/16; 105/367, 368 R

[56] References Cited
UNITED STATES PATENTS
2,682,958   6/1954   Francis ..................... 214/16.1 B FOREIGN PATENTS OR APPLICATIONS
108,915   6/1899   Germany .............................. 211/18
466,850   10/1928  Germany .............................. 211/17

Primary Examiner—Roy D. Frazier
Assistant Examiner—Richard L. Stroup
Attorney—Carlton Hill et al.

[57] ABSTRACT

Storage device for bicycles and the like, storing bicycles off the floor along the wall or ceiling of a garage or like storage area. The device operates on the principle of a vertically sliding garage door opener and has a channeled track extending from the floor to the ceiling and along the ceiling. A bicycle rack having rollers at its advance and rear ends, which ride between the flanges of the channels of the track is positioned along the floor for loading with bicycles, strapped or otherwise secured thereto, and is moved upwardly along the wall and ceiling of the garage under the control of a flexible cable, trained from a winding drum. A stop is provided to limit movement of the rack along the floor and prevent the advance rollers from coming off the rack as the rack moves along the floor.

17 Claims, 6 Drawing Figures

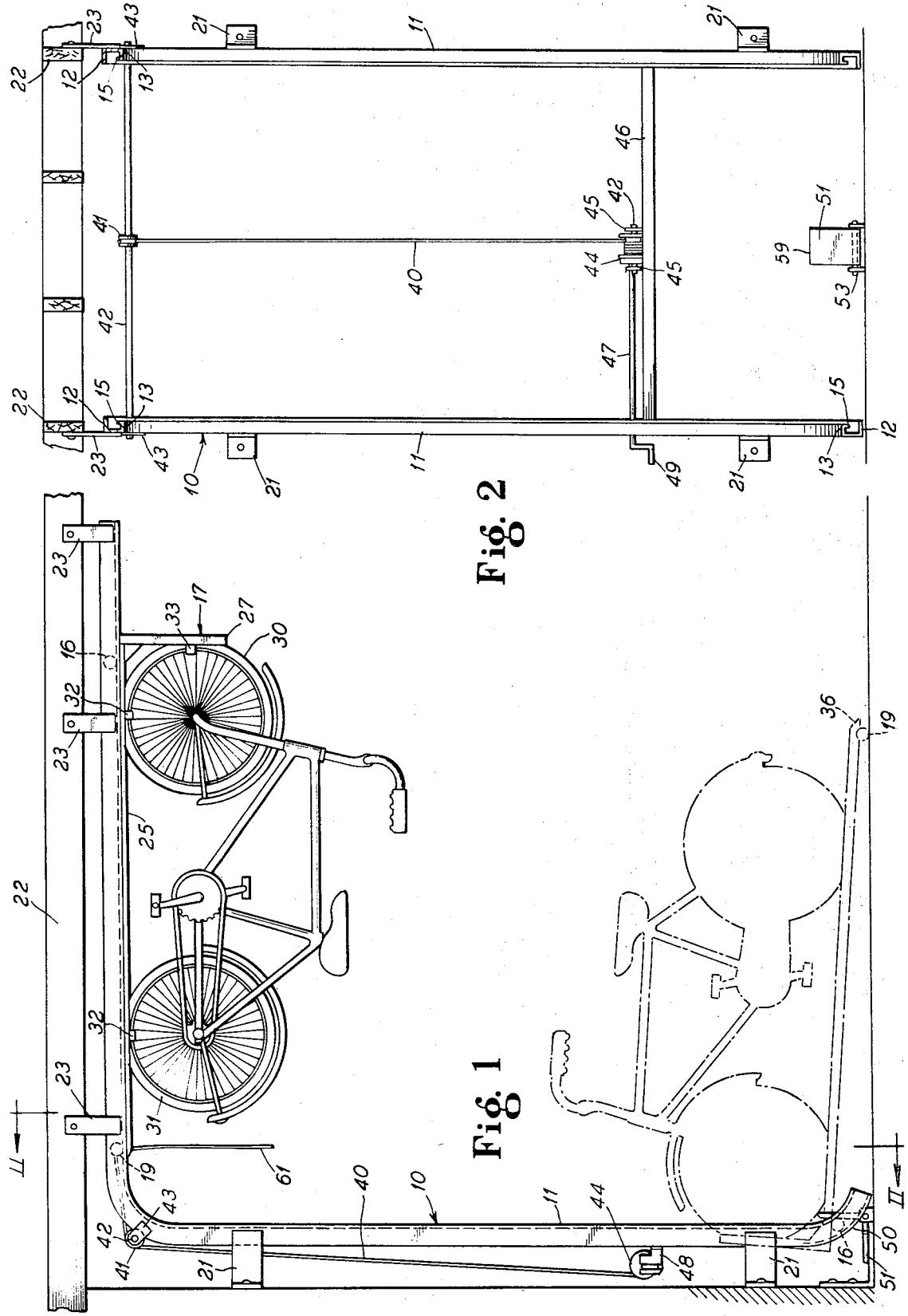

ABSTRACT3,770,133

BICYCLE STORAGE DEVICE

FIELD OF THE INVENTION

Off-floor storage rack for bicycles and the like.

BACKGROUND, SUMMARY AND ADVANTAGES OF INVENTION

Bicycles, when not is use, are usually stored in garages and rest along the wall of the garage or else are carried in floor racks. The floor racks require an undue amount of floor space and where the garage contains two cars, the floor space is not available, particularly where there are more than two bicycles in a family, with the result that the bicycles impede access to at least one car and frequently scratch or nick the car, or even may be run over by the car when backing out or entering the garage.

In accordance with the present invention, I utilize the principles of a conventional vertically sliding garage door opener and place the tracks for the door along the side wall of the garage and extend the tracks from the floor to and along the ceiling of the garage. A bicycle rack is guided in the tracks and rests on the floor when loading with bicycles and is arranged to hold the bicycles in upright positions on the floor. The rack, when loaded with bicycles, is moved along the track by a conventional door opener cable trained from a winch manually or power operated, or is raised with the assist of the tension of springs aiding in lifting the rack to be suspended from the ceiling and controlling lowering of the rack to the floor.

The advantages of the present invention are that more than one bicycle may be stored in a garae and require little, if any, of the storage area that is otherwise provided for cars in the garage.

A further advantage of the storage device is in its simplicity and adaptability for storing bicycles, to be suspended from the ceiling over the hood of a car and thereby requiring a minimum of floor area, and enabling many bicycles to be stored, without interfering with the cars in the garage.

A principal object of the present invention, therefore, is to provide a storage device for bicycles arranged with a view toward utmost simplicity in construction and efficiency in operation and storing the bicycles off the floor so as to require a minimum amount of floor space in the garage.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a view in side elevation of a storage device constructed in accordance with the principles of the present invention, showing in solid lines a bicycle suspended from its rack to depend from the ceiling, and showing the rack for the bicycle on the floor with the bicycle loaded thereon, by broken lines.

FIG. 2 is a sectional view taken substantially along line II—II of FIG. 1.

DESCRIPTION OF PREFERRED EMBODIMENT OF INVENTION

Figure 3:
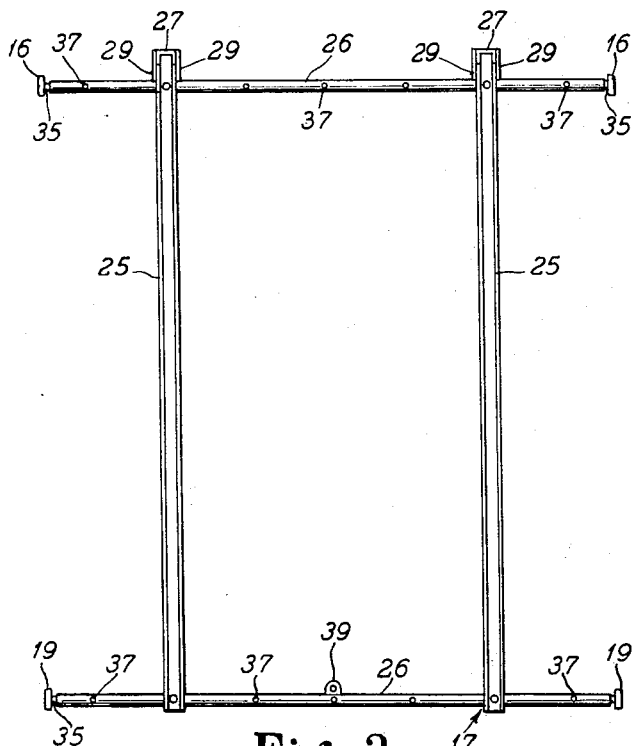
FIG. 3 is a top plan view of the bicycle rack.

In the embodiment of the invention illustrated in FIGS. 1 and 2 of the drawings, I have shown a bicycle storage device 10 including a track 11 in the form of a pair of parallel spaced channels opening toward each other and having flanges 12 and 13 extending from the webs of the channels.

The flanges 13 are shown in FIGS. 1 and 2 as being the outer flanges of the track as the track extends along the wall of the garage or other storage facility and the lower flange as the track extends along the ceiling. The flanges 13 each have a gib 15 extending inwardly therefrom for the length thereof. The gibs 15 of opposite flanges 13 cooperate with the flanges 12 to form a guide track for advance rollers or wheels 16 at the advance end of a bicycle rack 17 when traveling upwardly along the track, and with trailing rollers 19 at the trailing end of the rack 17, to guide the rack for movement along the track 11 upwardly along the wall of the building and to suspend the rack from said track from the ceiling of the building. The rollers 16 and 19 may be conventional garage door rollers.

As shown in FIGS. 1 and 2, brackets 21, shown as being in the form of angle brackets are secured to the wall of the garage on their vertical legs and to the track 11 on their horizontal legs, to support the track to extend upwardly along the wall of the garage in parallel relation with respect thereto. The track 11 turns from the wall of the building about a uniform arc at the upper end of its path of travel, to extend parallel to the ceiling. The horizontal run of the track is suspended from ceiling beams 22, as by suspension straps 23, suitably secured to the ceiling beams and depending therefrom and welded or otherwise secured to the flanges 13 of the horizontal run of the track.

The rack 17 is shown in FIG. 3 as being in the form of an open framework, comprising at least two parallel spaced upwardly opening channels connected together adjacent their leading and trailing ends by cross bars 26. The cross bars 26 are hollow rectangular cross bars of sufficient capacity to carry four or more bicycles. An upright 27 in the form of a channel extends upwardly of the leading end of each channel 25 and opens to said channel and may be welded or otherwise secured thereto. Gussets 29 extending along opposite sides of the channels 25 and 27 are provided to brace the channels 27 to the channels 25 and may be welded or otherwise secured to said channels. The uprights 27 are adapted to receive a front wheel 30 of a bicycle, while the channels 25 are adapted to receive a rear wheel 31 of the bicycle and the front wheel of the bicycle. The wheels 30 and 31 of the bicycle may be clamped, clipped or strapped to the channels 25 and 27 in any suitable manner. Straps 32 are diagrammatically shown in FIG. 1 as strapping the front and rear wheels of the bicycle to the associated channel 25. A strap 33 is diagrammatically shown as strapping the front wheel to the upright channel 27. The straps may be of various well-known forms and form no part of the present invention, so need not herein be shown or described in detail.

The advance rollers 16 are freely mounted on shafts 35 mounted in and extending outwardly of the advance cross bar 26 while the trailing rollers 19 are mounted on similar shafts 35 mounted in and extending outwardly of the trailing cross frame member 26.

The trailing portions of the channels 25 are beveled at their trailing ends as indicated by reference numeral 36, to provide an inclined surface at the trailing end of the rack, to reduce any obstruction at the trailing end of the rack which may be likely to be tripped over or to tear the clothes. The extreme end of the beveled ends 36 of the channels may be rounded so as to avoid any sharp surfaces.

It will be noted in FIG. 3 that the leading and trailing cross bars 26 are provided with drilled holes at equally spaced intervals therealong as indicated by reference numerals 37 to accommodate the positions of the channels 25 to be changed and also to receive bolts for bolting said channels to said cross bars and to accommodate the mounting of additional channels on said cross bars to increase the storage capacity of the rack. As shown in FIG. 3, the drilled holes 37 are spaced apart differences equal to half the width of the handle bars of a bicycle. Thus, when it is desired to increase the storage capacity of the rack, an additional channel 25 may be mounted on the rack in the central bolt holes 37 to provide capacity for three bicycles. Where it is desired to store more than three bicycles, the channels 25 shown in FIG. 3 may be unbolted from the cross bars 26 and bolted to the end bolt holes 37 of said cross bars. Other channels may be bolted in the third bolt holes 37 from the ends of the cross bars 26, to provide storage capacity for four bicycles. Where the handle bars may be narrower, a fifth channel may be bolted to the central bolt holes 37 in the cross bars 26 to provide storage capacity for five bicycles. The bicycles, of course, may be in staggered relation with respect to each other with the front wheels strapped to alternate uprights, and the rear wheels of the bicycles strapped to the uprights in between. The spacing between the channels of the track 11, however, may be varied and the cross bars 26 may be increased in length to increase ths storage capacity of the rack.

The rack 17 is shown as having a connector 39 for a cable 40 connected to the trailing cross bar 26. The connection from said connector to the cable may be conventional cable connections as for example, a clevis (not shown) connected to the trailing end of the cable and pivoted to the connector 39. In the form of the invention shown in FIGS. 1, 3 and 4, the cable extends from the connector 39 beneath the rack and about the advance cross frame member 26 and upwardly of said cross frame member to and about a sheave 41 freely rotatably mounted in brackets 43. Said brackets are secured to the outer sides of the channels forming the track 11, adjacent the upper end thereof in the region where the track curves from the vertical to extend parallel to the ceiling.

From the sheave 41, the cable extends downwardly to and about a winch 44. Said winch is mounted on a shaft 42 journalled in bearing brackets 45 extending upwardly of a cross bar 46 connecting the channels of the track 11 together. A shaft 47 is provided to turn the winch 44 to wind the cable 40 thereon. The shaft 47 is shown in FIG. 1 as extending parallel to the shaft 42 and offset from the axis of the shaft 42 and mounted at its outer end in a bearing bracket 48 extending from a flange 12 toward the wall of the building. A crank 49 is provided on the outer end of the shaft 47 to enable said shaft to be manually turned. The shaft 47 is connected with a winch 44 to rotatably drive said winch through a suitable gear reduction drive (not shown) of a conventional form. A conventional pawl and ratchet (not shown) may also be provided, which is manually operable to hold the winch 44 from rotation in an unwinding direction.

Figure 4:
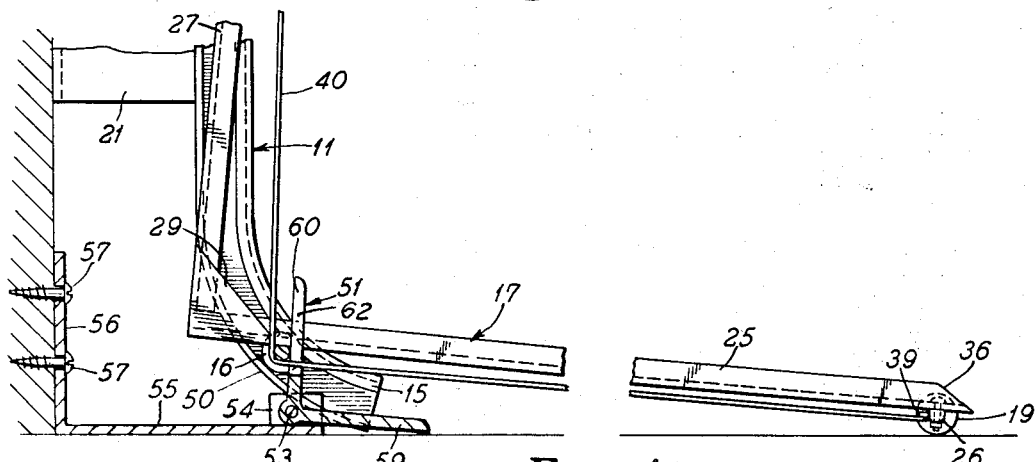
FIG. 4 is a fragmentary sectional view illustrating the track for the rack as it curves to the floor and the stop for preventing the advance rollers of the rack from coming off the rack, as the rack is lowered to floor level.

The track 11 curves away from the wall of the building toward the floor at its lower end as indicated by reference numeral 50 and the flanges 12 terminate at floor level, to accommodate the trailing rollers 19 to fit within said track. During operation of the rack to raise and lower a bicycle thereon, the leading rollers 16 are always in the track 11 and are held from coming out of the track upon lowering movement thereof by a movable stop 51, shown as being in the form of a bell crank. The stop 51 is pivoted at its center on a transverse shaft 53, carried at its opposite ends in upright ears 54 extending upwardly of a plate 55 extending along the garage floor. The plate 55 terminates at the garage wall to a vertical plate 56 extending at right angles thereto, and secured to the garage wall as by screws 57, or any other suitable securing devices. As shown in FIG. 4, the stop 51 includes an actuating arm 59 extending from the pivot shaft 53 generally along the floor when the stop is in position to retain the rollers 16 to the track, and has a stop arm 60 extending at right angles with respect to said actuating arm. The stop arm 60 is thus held from tilting in a release or clockwise direction by the actuating arm 59 and is abutted by the leading cross frame member 26 which is the trailing member during lowering movement of the rack, to prevent movement of the rack 17 beyond the position shown in FIG. 4. The stop arm 60 has a slot 62 therein along which the cable 40 is trained (FIG. 4), when said arm is in its upright position.

As the rack 17 is lifted along the track 11 by operation of the winch 44, turned by the handle 49, the trailing rollers or wheels 19 will roll along the floor and come into the track 11, and be retained thereto by the flanges 12 and 13 and the gibs 15. Upon continued upward travel of the rack, the trailing cross frame member 26 will come into engagement with the upright stop arm 60 and pivot said stop arm from the position shown in FIG. 1 to a generally horizontal position along the floor as shown in FIG. 1. The actuating arm 59 will then remain in the upright position shown in FIG. 1 until lowering movement of the rack, at which time the trailing cross frame member 26 will engage said actuating arm and pivot it in a clockwise direction to bring the stop arm 60 into an upright stopping position to engage the advance cross frame member 26 and retain the advance rollers or wheels 16 to the track 11.

It should be understood that with the form of the invention illustrated in FIGS. 1 to 4, as the rack 17 moves upwardly along the vertical portion of the track 11 by turning movement of the winch 44 by the hand crank 49, the advance wheels or rollers 16 will move along the curved portion of said track to and along the horizontal portion thereof extending along the ceiling of the garage. The positioning of the rack along the horizontal portion of the track is limited by the position of the sheave 41 and with the position of the sheave 41 shown, the rack 17 will be in angular relation with respect to the track at the extreme lifting position of the cable 40. In order to place the rack 17 into the horizontal position shown in FIG. 1, a strap 61 may be connected to the trailing cross frame member 26, and used to extend the rack along the track 11 to suspend the bicycle from the ceiling in the manner shown by solid lines in FIG. 1. Where a strap is not provided, the bicycle itself may be grasped by the hand and the bicycle and rack may be advanced along the track 11 into the proper position.

When it is desired to lower the bicycle, the strap 61 may be grasped to start the rack and bicycle along the track or the hand crank 49 may be turned to first take up on the flexible cable 40 and to then accommodate the rack to be moved downwardly along the track 11 under the control of said hand crank, or by gravity, with sufficient speed to accommodate the rack and bicycle or bicycles thereon to move downwardly along the track and along the floor into the broken line position shown in FIG. 1. In this position, further movement of the rack is stopped by the stop arm 60 of the stop 51.

It should here be understood that while I have shown a hand operated winch for raising the rack 17 along the track 11 and for controlling lowering of said rack, that the winch may be power driven by a suitable motor connected with said winch through reduction gearing, which may be worm-and-worm gearing of the self-locking type to prevent overrunning of the winch and cable during lowering movement of the rack.

The winch also need not necessarily be located in the position shown but where the winch is power driven, it may be located at the end of the horizontal portion of the track to enable the rack to be moved along the track by power into and along the horizontal portion thereof. The winch 44 and its location is, therefore, shown for illustrative purposes only. The location of the sheave 41 may also be varied, where required, to cause movement of the rack into a horizontal position along the track 11.

Figure 6:
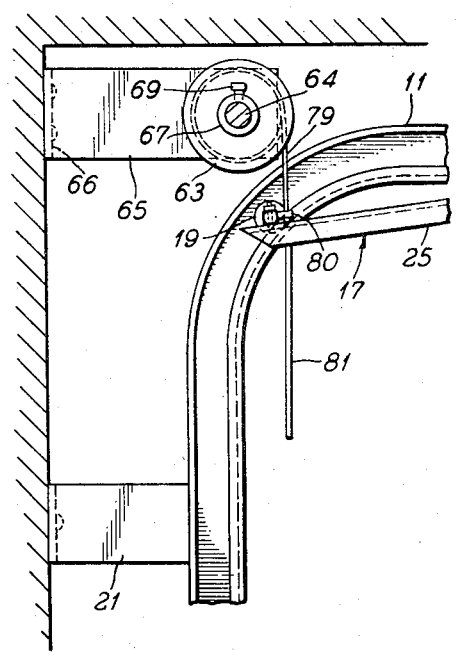
FIG. 6 is a fragmentary sectional view taken substantially along line VI—VI of FIG. 5.
Figure 5:
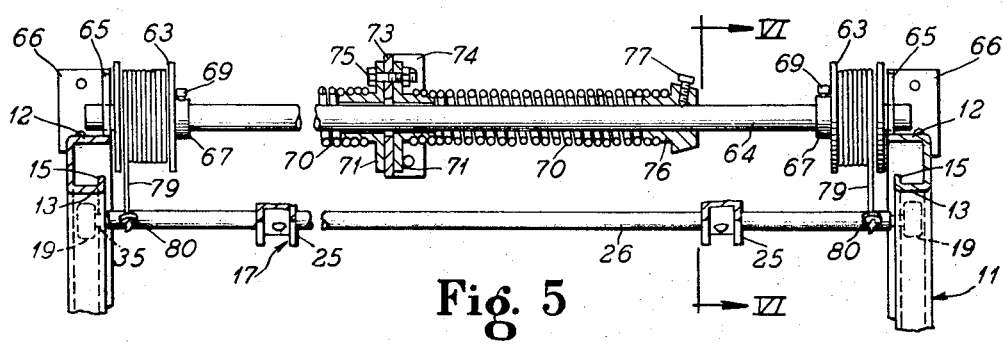
FIG. 5 is a fragmentary transverse sectional view of the rack showing the adaptation of torsion springs controlling the lowering of the rack and assisting in the raising of the rack to its storage position.

In FIGS. 5 and 6 of the drawings, I have shown the adaptation of torsion springs for controlling downward movement of the rack 17 and assisting in upper travel of said rack along the track 11. In this form of the invention, the rack 17, track 11 and stop 51 are of the same construction as in the form of the invention illustrated in FIGS. 1 through 4, so like reference numerals will be applied to the same parts as in FIGS. 1 through 4.

As shown in FIGS. 5 and 6, two winding drums 63 are mounted adjacent the ceiling on a transverse shaft 64 disposed above the horizontal portion of the track 11 in the region where the track curves from the vertical to the horizontal. The shaft 64 is suitably journalled at its opposite ends outside of the winding drums 63 on suitable bearing brackets 65 extending from the wall of the building, and having right angled legs 66 secured to the wall of the building, as by screws or bolts, or any other suitable securing means. As shown in FIGS. 5 and 6, each winding drum has a collar or hub 67 extending inwardly therefrom and shown as securing the associated drum to said shaft 64 as by a set screw 69.

Two aligned torsion springs 70 encircle the shaft 64 and extend along the hubs of flanged coupling members 71 at their inner ends and are suitably secured thereto. The coupling members 71 clear the shaft 64 to accommodate rotation of said shaft with respect to said coupling members and are secured to a bracket plate 73 extending from the wall of the building and having a right angled leg 74 bolted or otherwise secured to the wall of the building. The flanges of the flanged coupling members 71 extend along opposite sides of the bracket plate 73 and are bolted thereto as by nuts and bolts 75, in a conventional manner. The opposite or outer ends of the torsion springs 70 are suitably secured to collars 76 on the shaft 64. Set screws 77, or other securing means are provided to secure said collars to said shaft, to rotate therewith.

Each winch or drum 63 has a flexible cable 79 wound thereon connected to the trailing cross frame member 26 of the rack 17 by connectors 80 extending from said cross frame member. The connection from the cables 79 to the connectors 80 may be in the form of a clevis (not shown) or may be any suitable form of connector and are no part of the present invention, so need not herein be shown or described in detail.

When the rack 17 is in the position shown in FIG. 5, the torsion springs 70 are in their relaxed condition. A strap 81 may be connected with the rear or trailing cross frame member 26 and depend therefrom when the rack is in its elevated position. Upon grasping the strap 81 and pulling downwardly on the rack 17, to bring the rollers 19 into the vertical extending portion of the track 11, the weight of the rack 17 along with the bicycles thereon, will cause said rack to move downwardly along the track 11 against the force of the springs 70 onto and along the garage floor into the position shown in FIG. 4. In this position of the rack, the stop arm 60 of the stop will engage the leading cross frame member 26 and retain the rollers 16 to the track. During downward travel of the rack tension will be taken up on the torsion springs 70 by winding the springs about the shaft 64 by the collars 76. This will retard downward travel of the rack to prevent the rack from running away and dropping to the floor. The tension of said springs, however, is not sufficient to prevent the front rollers 19 of the rack from coming out of the guide track 11 to support the rack for movement along the floor in the position shown in FIG. 4.

When it is desired to move the rack along the floor upwardly along the track 11 into position suspending bicycles thereon from the ceiling, it is merely necessary to start the rack along its upward travel along the track 11 by pulling on a bicycle, after which time the torsion springs 70 will assist in raising the rack to extend along the ceiling. The rack 17 of itself will stop in the position shown in FIG. 6. Where it is desired to place the entire rack in the horizontal portion of the track, it is merely necessary to grasp the strap 81 and pull the rack into this position.

It should here be understood that while I have shown torsion springs and winding drums for retarding downward travel of the rack and the bicycles thereon, and for assisting in raising the rack, that conventional tension springs commonly used for raising and lowering garage doors may be substituted in place of the torsion springs. The torsion springs, however, require less room than the tension springs and also the use of two torsion springs extending from the center toward opposite ends of the shaft 64 has a longer effective travel than the tension springs, and accommodates the lowering of the rack at a sufficient rate of speed to move along the floor without assistance.

I claim as my invention:

1. In a storage device for bicycles and the like,
a pair of tracks supported to extend vertically from the floor along the wall of a building and comprising parallel spaced facing channels having entering ends curving downwardly to floor level,
a bicycle rack guided in said tracks and adapted to rest on the floor to accommodate the placing of a bicycle thereon and to move upwardly along said tracks for storing the bicycle off the floor and comprising a generally open frame including a plurality of parallel spaced upwardly opening channels each of which is adapted to receive the wheels of a bicycle,
cross frame members connecting said channels together and having rollers freely mounted on the outer ends thereof and ridable in said track,
means detachably securing at least one bicycle to said rack, and
stop means accommodating the rack to move upwardly along said track past said stop means and to maintain the advance rollers of said rack in said track at the end of downward travel of said rack.

2. The storing device of claim 1,
wherein the rack has channel-like uprights extending upwardly of the advance ends of said channels and registering with said channels, for receiving individual wheels of a bicycle, and
wherein the means detachably securing the wheels of the bicycle to said rack comprise strap means securing the wheels to an associated channel, and other strap means for detachably securing one wheel of each bicycle to an associated of said uprights.

3. The bicycle storing device of claim 2,
wherein the stop means comprises a bell crank pivoted intermediate its ends and having a stop arm extending upwardly between said track adjacent the curved lower end thereof and an actuating arm extending generally along the floor,
whereby said actuating arm is moved by the trailing cross frame member of said rack as the trailing cross frame member engages said stop arm and passes thereby, and pivots said actuating arm into an upright position, and
whereby on lowering movement of the rack, the trailing cross frame member leading the advance rollers, comes into engagement with said actuating arm and pivots the bell crank to raise said stop arm to engage the advance cross frame member of the track and limit outward movement of said rack along said track.

4. The storing device of claim 2,
wherein means are provided for raising said rack upwardly along said track comprising a flexible cable connected to said rack at the trailing end thereof and extending along said track upwardly toward the upper end thereof, and
wherein a winding drum is provided for winding in on said cable to exert an upward pulling force on said rack along said track, and to retard lowering movement of said rack along said track.

5. The storing device of claim 4,
wherein the track curves at its upper end to extend in a horizontal plane along the ceiling, and means are provided for suspending the horizontal portion of said track to extend along the ceiling, to support said rack to suspend at least one bicycle secured to said rack from the ceiling.

6. The storing device of claim 5,
wherein the means raising the rack along the track to be supported to suspend at least one bicycle from the ceiling, comprises at least one winch, a direction changing sheave adjacent the top of said track, training the cable to extend downwardly along said track, and
wherein means are provided to rotatably drive said winch to assist in raising said rack along said track, and to retard rotation of said winch, to retard lowering movement of said rack along said track.

7. The storage device of claim 6,
wherein the winch is manually operable and controllable.

8. The storage device of claim 5,
wherein spring means placed under tension by lowering of said rack along said track are provided to retard lowering of said rack along said track, to move therealong at a controlled rate of speed, and to assist in raising said rack along said track.

9. The storage device of claim 8,
wherein the spring means comprise torsion spring means and winding drums taking up tension on said spring means by lowering movement of said rack along said track, and rotatably driven by said spring means to assist in raising said rack along said track.

10. The bicycle rack of claim 9,
wherein the cross frame members are adapted to carry more than two channels equally spaced therealong to accommodate the rack to store more than two bicycles.

11. The bicycle rack of claim 9,
wherein the cross frame members are provided with a plurality of through bolt holes at equal spacings therealong, and
wherein the bolt holes extending through said cross frame members are adapted for the connection of a plurality of channels thereto, to adapt the rack for carrying more than two bicycles.

12. The bicycle storage device of claim 9,
wherein the stop means for maintaining the advance rollers in the track comprise a bell crank pivoted intermediate its ends for movement about a stationary transverse axis and having a stop arm extending upwardly from the axis thereof and an actuating arm spaced from said stop arm and engaged by said rack to move said stop arm into position to extend upwardly of the discharge end of said track and engage a cross frame member carrying the leading rollers, upon lowering movement of said rack along the track.

13. The bicycle storage device of claim 12,
wherein the winding drums are disposed along the ceiling, and
wherein flexible cables are connected from said winding drums to said rack at the trailing end thereof 14. In a storing device for bicycles and the like,
a pair of tracks supported to extend vertically from the floor along the wall and ceiling of a building and comprising parallel spaced facing channels having entering ends curving downwardly to floor level and curving at the upper ends thereof to extend in a horizontal plane along the ceiling, a roller supported bicycle rack having a leading end and a trailing end guided in said tracks, in which the trailing end is adapted to rest on the floor, said rack having at least one upwardly opening channel member extending therealong to accommodate the placing of a bicycle on said channel and to move upwardly with said rack along said tracks for storing the bicycle to depend from the ceiling, means detachably securing the front and rear wheels of the bicycle to said rack, other means for moving the rack upwardly along said track and along the portion thereof extending along the ceiling of a building, and movable stop means for accommodating the rack to move upwardly along said tracks past said stop means and to maintain the advance rollers of said rack in said track at the end of downward travel of said rack.

15. The bicycle storing device of claim 14, wherein the stop means is free from said channel and comprises a bell crank pivoted intermediate its ends and having a stop arm extending upwardly at one side of said channel adjacent the curved lower end thereof, and an actuating arm extending generally along the floor, whereby said actuating arm is moved by said rack as the trailing end of said rack engages said stop arm and passes thereby and pivots said actuating arm into an upright position, and whereby on lowering movement of said rack, the trailing end of said rack leading the leading end comes into engagement with said actuating arm and pivots the bell crank to raise said stop arm to engage the leading end of the rack and limit outward movement of said rack along the floor.

16. The storage device of claim 14, including spring means placed under tension by lowering of said rack along said track to retard lowering of said rack and cause said rack to move along said track at a controlled rate of speed, and to assist in raising said rack along said track.

17. The bicycle rack of claim 16, wherein the rack is adapted to carry more than two channels equally spaced therealong to accommodate the rack to store more than two bicycles.

* * * * *